July 27, 1937.                    C. L. EKSERGIAN                    2,088,191
                                COMPOSITE BRAKE DRUM
                            Original Filed April 4, 1932
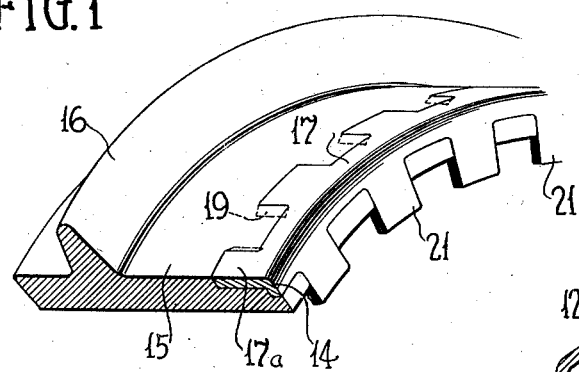
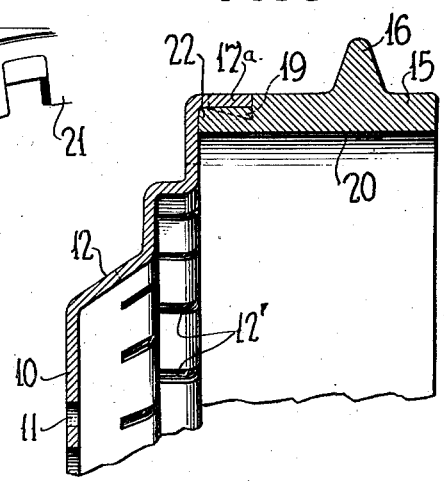
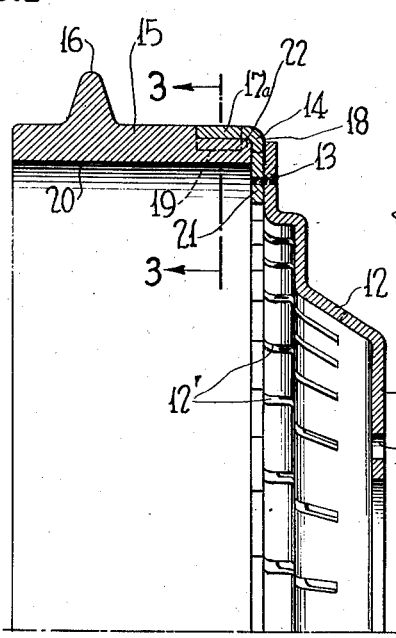
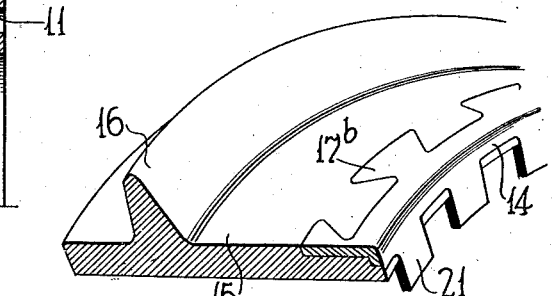
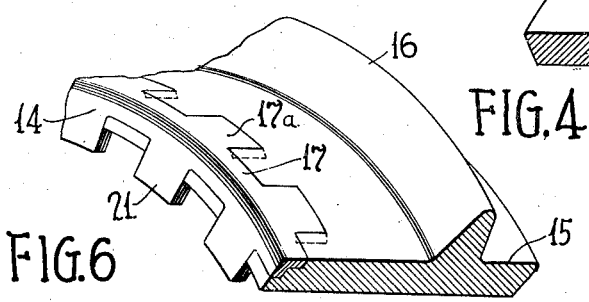
INVENTOR.
CAROLUS L. EKSERGIAN
BY John P. Tarbox
ATTORNEY.

Patented July 27, 1937

2,088,191

UNITED STATES PATENT OFFICE 2,088,191

COMPOSITE BRAKE DRUM

Carolus L. Eksergian, Detroit, Mich., assignor to Budd Wheel Company, Philadelphia, Pa., a corporation of Pennsylvania Application April 4, 1932, Serial No. 603,083
Renewed April 20, 1935

7 Claims. (Cl. 188—218)

My invention relates to the art of brakes and it has been my particular object to produce a brake drum for vehicles, and more particularly, it has been my object to improve the structure shown in my co-pending application Serial No. 571,726, filed October 29, 1931. In that application I provided a composite brake drum assembly, e. g., a braking ring of cast iron and a head of pressed steel, particularly directed to the elimination of the phenomenon known as bell mouthing. The present application provides an improvement over the aforesaid co-pending application in that the manner of securement between the intermediate securing ring and the cast braking ring is improved.

A prime object of the present invention is a cast-in attaching ring or drum head especially adapted for casting in by the centrifugal casting processes.

Another prime object is to provide a means of integrally securing the intermediate ring to the cast braking ring in such a manner as to obviate any possibility of the intermediate ring breaking away from the cast ring either at the time of casting or subsequently and irrespective of the direction of the strain.

A further object of my invention has been to provide an attaching ring or head capable of such flexibility as to allow the casting to cool and shrink as though it were a single unitary piece, thus relieving strains which are ordinarily set up in cases where the usual form of attaching rings or heads are cast integrally with the braking rings.

Further objects and advantages of my invention will be obvious from a reading of the subjoined specification in the light of the attached drawing, in which Figure 1 is a perspective sectional view of the cast braking ring and intermediate securing ring comprising a part of my invention.

Figure 2 is an axial cross sectional view of a half drum, illustrating the manner in which the intermediate ring is secured to the casting.

Figure 3 is a sectional view taken on the line 3—3 of Figure 2, illustrating further the manner in which the intermediate ring is secured to the casting.

Figure 4 is a perspective sectional view of a modified form of the invention.

Figure 5 is a partial axial section of yet another modification.

Figure 6 is a perspective sectional view of the cast braking ring and a modified form of securing ring.

Referring to the drawing by reference characters, the numeral 10 illustrates the stamped or pressed metal head of the composite drum of my invention. The numeral 11 indicates one of a series of securing holes or bolt receiving openings, through which the drum as an entirety may be secured to the vehicle hub. Head 10 is provided with an intermediate section 12 embodying an L or an S bend or the equivalent, which admits of a freer radial expansion and contraction, and a radially extending flange portion as indicated at 13. Section 12 is preferably slotted as indicated at 12' to further increase the radial yieldability of the head 10 as a whole. The flanged portion 13 of head 10 may be connected in any approved manner, e. g., by spot welding, as shown, to an angle cross section intermediate attaching ring 14, which in turn is integrally connected to a cast metal braking ring 15 which constitutes the actual braking member of my drum assembly. As disclosed in my co-pending application mentioned above, this drum is provided with a heavy rib 16 which plays a large part in maintaining the proper contour of the drum throughout the various ranges of temperature and pressure created by repeated braking. It is this annular rib 16 which plays a large part in the prevention of bell mouthing.

The intermediate ring 14 is substantially of angle cross section, comprised of axially and radially extending arms indicated generally by the numerals 17 and 18. The axially extending portion 17 is provided with a series of equally spaced cutaway portions, forming ears 17a flanged downwardly on their sides at an acute angle to the body of the ears, as at 19 in Figure 3. These cut-away portions do not extend axially throughout the entire extent of the arm 17, but rather are of limited depth as indicated in Figures 1 and 2, leaving the apex of the angle section continuous. The angular flanges 19 extend inwardly to approximately the mid-section of the cast braking ring but do not weaken the structure by approaching too closely the inner braking surface 20.

The radially extending arm 18 of the ring 14 is also cut away at intervals, thereby providing an equally spaced series of radially extending ears 21 through which attaching ring 14 may be secured to flange 13 of head 10. This securement may be effected by any approved method such as welding, as shown, riveting, or bolting, etc. As in the instance of the arm 17, the cut-away portions of the radially extending arm 18 of this ring terminate short of the apex of the section leaving a continuous portion at the apex. Ears 21 are preferably arranged in a staggered relationship with respect to ears 17a, thus giving the continuous apex portion of ring 14 a relatively very small cross section in the planes between the ears. The ring 14 is thus strong enough to maintain its form during its assembly with the cast braking ring 15, without being so rigid annularly as to provide objectionable resistance to the shrinkage of the casting as it cools.

The manner of assembly of this type of ring is very much the same as that utilized in the afore-mentioned copending application. The ring 14 is inserted in the mould which forms the cast ring 15. As the molten metal flows into the mould, (particularly when flowed therein by the centrifugal casting processes), it flows about the projecting flanges 19, and flush with the peripheral surfaces of both the axially extending arm 17 and the radially extending arm 18 of the ring 14. The radially extending portion 18 thus affords a circumferential mechanical interlock sufficient to take the torque reaction set up under the most severe braking conditions. This interlock, however, is augmented by the radial and axial interlock afforded by the ears 17a and their angularly disposed flanges 19. Inasmuch as these flanges 19 are of limited axial extent, stopping short of the apex of ring 14, the metal of the casting flows axially around the apex ends of these flanges as indicated generally by the numeral 22. This provision affords a secure axial interlock, thus completing the mechanical interlocking of the intermediate ring and the cast braking ring in every direction from which strains may be imposed.

The outer diameter of ring 14 is substantially equal to the periphery of the body portion of the braking ring 15. Inasmuch as the metal of the casting flows flush with both of the outer surfaces of ring 14, this ring comprises essentially one corner of the finished drum. This feature is of particular advantage in the casting step, by virtue of the fact that the ring 14 is merely laid in the mold, and is positioned therein by the end and side walls, thus necessitating no special clips nor fastening means to hold it in concentric alignment with the mold during the casting step. The preferred method of forming the braking ring 15 is by the centrifugal casting process, and the particular configuration of ring 14 is of substantial advantage in this process, in that the molten metal is free to flow in an unobstructed course throughout the mold. The body of ring 14 marks the extent of flow, thus not causing the molten metal to pursue a sinuous course to fill the mold. Also, air may be more completely excluded from the mold and from the finished casting, because the ring fits closely into the end of the mold. Further, the casting cools more uniformly by virtue of the location of ring 14.

The modification shown in Figure 4 is essentially similar to that shown in Figure 1. A series of conventional dovetail form ears 17b are provided in the axially extending arm 17 of the ring 14 and by means of these an axial and annular interlock is secured. This form of the invention may be also provided with angularly extending flanges 19, or on the other hand, may depend for its radial interlock on the side walls of dovetailed portion 17 and the autogenous joinder in general. The radially extending arm 18 of ring 14 may be comprised by a series of radially extending ears 21 as heretofore.

A modification is the making of the securing ring and the mounting or backing plate a unitary structure, by providing such a section for this plate as will render it radially flexible. Radial flexibility is a very desirable characteristic in a mounting plate inasmuch as the plate must yield inwardly with the braking ring as it cools after the casting step, and, in use, the plate must both expand and contract with the braking ring as it moves radially due to the heat of varying braking actions. The solid head or mounting plate is secured to the braking ring in an annular securement zone by both radially and axially extending interlocks, such as those indicated by numerals 19, 21 and 17, respectively, as shown in detail in Figure 5.

A further modification of my invention is shown in Figure 6, in which a different type of attaching ring is used. In this form, the axially extending ears 17a and the radially extending ears 21 are arranged opposite each other. These ears thus become, in effect, annular series of separate attaching means, held together before assembly with the cast ring, by the apex portion, which is of reduced radial and axial extent. An attaching ring, constructed according to this modification, has been found to possess a very high degree of annular yieldability, and after assembly with the cast ring, becomes substantially integral therewith. It thus appears that the ratio between the autogenous joinder afforded by the mechanical interlocks of ears 17a, flanges 19 and ears 21, and the resistance to expansion and contraction offered by the connecting apex portions, is such that the attaching ring 14 and the cast ring 15 comprise essentially a unitary piece.

Summarizing, it will be seen that I have attained the objects of my invention in a novel and efficient manner. I have devised an attaching ring suitable for the use with centrifugal method of casting, by providing a ring of substantially the same diameter as the braking ring. By providing flanges and projecting ears, I have secured a most efficient mechanical interlock between the attaching ring and the braking ring. Further, by reducing the transverse extent of the effective continuous portion of ring 14, I have attained an attaching ring capable of such radial yieldability that it offers practically no resistance to the expansion and contraction of the drum. These, and other objects of my invention have been attained in a manner as efficient as the idea is novel.

While I have illustrated several embodiments of my invention, still others will be obvious to those skilled in the art, and I do not therefore wish to be limited to the exact form of the invention disclosed, but intend that the attached claims as read and interpreted in the spirit of my invention shall cover all its embodiments.

What I claim is:

1. A brake drum comprising a cast braking ring and an angle cross section securing ring, said angle cross section ring including ears in each of its arms, and having its arms integrally secured to said cast ring, said cast ring being securely interlocked with said ears.

2. A brake drum comprising a cast braking ring and an angle cross section securing ring, said angle cross section ring having ears in each of its arms and angular flanges in one of said arms and having its arms integrally secured to said cast ring, said cast ring being securely interlocked with said ears and said flanges.

3. A brake drum comprising a cast braking ring and an angle cross section securing ring, said angle cross section ring including ears in one of its arms, and dovetails in the other of its arms, and having its arms integrally secured to said cast ring, said cast ring being securely interlocked with said ears and said dovetails.

4. A brake drum comprising a cast braking ring and an angle cross section securing ring, said angle cross section ring including relatively staggered ears in each of its arms, and having its arms integrally secured to said cast ring, the metal of said cast ring being securely interlocked with said ears.

5. A composite brake drum comprising a cast braking ring and an angle section mounting member, said member including an axially extending arm having inwardly extending flanges affording a radial interlock between said braking ring and said mounting member.

6. A composite brake drum comprising a cast braking ring and an angle section mounting member, said member including an axially extending arm having inwardly extending flanges affording a radial and axial interlock between said braking ring and said mounting member.

7. A composite brake drum comprising a braking ring and an angle section mounting member, said member comprising alternate oppositely extending circumferentially spaced ears and joining portions, said ears being integrally locked with said braking ring, and said joining portions being of such diminished transverse extent as to allow the braking ring to freely expand and contract.

CAROLUS L. EKSERGIAN.